(12) United States Patent
Kang et al.

(10) Patent No.: US 6,756,537 B2
(45) Date of Patent: Jun. 29, 2004

(54) DYE-SENSITIZED SOLAR CELLS INCLUDING POLYMER ELECTROLYTE GEL CONTAINING POLY(VINYLIDENE FLUORIDE)

(75) Inventors: Man-Gu Kang, Daejeon (KR); Nam-Gyu Park, Daejeon (KR); Kwang-Man Kim, Daejeon (KR); Soon-Ho Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/356,559

(22) Filed: Feb. 3, 2003

(65) Prior Publication Data

US 2003/0145885 A1 Aug. 7, 2003

(30) Foreign Application Priority Data

Feb. 2, 2002 (KR) ................ 10-2002-0006052

(51) Int. Cl.$^7$ ............... H01L 31/04; H01M 14/00
(52) U.S. Cl. ............... 136/263; 136/256; 136/252; 429/111; 429/300; 429/303
(58) Field of Search ............... 136/263, 256, 136/252; 429/111, 300, 303

(56) References Cited

U.S. PATENT DOCUMENTS

| | | | |
|---|---|---|---|
| 4,927,721 A | | 5/1990 | Grätzel et al. |
| 5,728,487 A | | 3/1998 | Grätzel et al. |
| 5,814,420 A | * | 9/1998 | Chu ............... 429/104 |
| 6,245,988 B1 | * | 6/2001 | Gratzel et al. ............... 136/263 |
| 6,291,763 B1 | * | 9/2001 | Nakamura ............... 136/256 |
| 6,306,509 B2 | * | 10/2001 | Takeuchi et al. ............... 428/425.8 |
| 6,310,282 B1 | * | 10/2001 | Sakurai et al. ............... 136/263 |
| 2002/0040728 A1 | * | 4/2002 | Yoshikawa ............... 136/263 |
| 2002/0134426 A1 | * | 9/2002 | Chiba et al. ............... 136/263 |
| 2003/0062080 A1 | * | 4/2003 | Satoh et al. ............... 136/256 |
| 2003/0082437 A1 | * | 5/2003 | Sotomura ............... 429/111 |
| 2003/0127129 A1 | * | 7/2003 | Yoshikawa et al. ............... 136/263 |
| 2003/0152827 A1 | * | 8/2003 | Ikeda et al. ............... 429/111 |
| 2004/0031520 A1 | * | 2/2004 | Ryan ............... 136/263 |

FOREIGN PATENT DOCUMENTS

| JP | 2001-160426 | 6/2001 |
|---|---|---|
| JP | 2001-160427 | 6/2001 |

OTHER PUBLICATIONS

Pierre Bobhôte, et al.; "Highly Conductive Ambienet–Temperature Molten Salt"; Inorg. Chem. 1996. 35; pp. 1168–1178.

Christophe J. Barbé, et al.: "Nanocrystalline Titanium Oxide Electrodes for Photovoltaic Applications"; Journal of the American Ceramic Socoiety, vol. 80. No. 12; pp. 3157–3171, (1997).

Yanjie Ren, et al.; "Application of PEO based gel network polymer electrolytes in dye–sensitized photoelectrochemical cells"; Solar Energy Materials & Solar Cells 71, (2002); 253–259.

* cited by examiner

*Primary Examiner*—Alan Diamond
(74) *Attorney, Agent, or Firm*—Jacobson Holman PLLC

(57) ABSTRACT

A dye-sensitized solar cell including a polymer electrolyte gel having a poly(vinylidene fluoride) (PVDF) polymer is provided. The dye-sensitized solar cell includes a semiconductor electrode, an opposed electrode, and a polymer electrolyte gel interposed between the semiconductor electrode and the opposed electrode while including poly (vinylidene fluoride) (PVDF) polymer or the copolymer thereof. Here, the polymer electrolyte gel is formed of a N-methy-2-pyrrolidone solvent or a 3-methoxypropionitrile (MP) solvent and the PVDF polymer or the copolymer thereof which is dissolved in the solvent to a predetermined amount.

7 Claims, 2 Drawing Sheets

DYE-SENSITIZED SOLAR CELLS INCLUDING POLYMER ELECTROLYTE GEL CONTAINING POLY(VINYLIDENE FLUORIDE)

BACKGROUND OF THE INVENTION

This application claims priority from Korean Patent Application No. 2002-20908, filed on Feb. 2, 2002, in the Korean Intellectual Property Office, the disclosure of which is incorporated herein in its entirety by reference.

1. Field of the Invention

The present invention relates to solar cells, and more particularly, to dye-sensitized solar cells including polymer electrolyte gel.

2. Description of the Related Art

As the buried amount of fossil fuel is exhausted, it has been tried to convert solar energy into electric energy using semiconductors and it has been considered as a promising field, industrially. In addition, as policies of restricting the generation of carbon dioxide are established, solar cells that generate electricity without generating contaminants provide solutions for the needs of saving environment and generating energy.

A representative example of conventional dye-sensitized solar cells was provided by Gratzel et al. from Switzerland, in 1991. Gratzel et al. disclosed a photoelectric chemical solar cell using an oxide semiconductor which is formed of photosensitive dye particles and nanocrystalline titanium dioxide. The solar cell provided by Gratzel et al. has an advantage of being manufactured at a low cost. Conventional dye-sensitized solar cells including nanocrystalline oxides are formed of nanocrystalline oxide semiconductor cathode, platinum anode, dye coated on the cathode, and oxidation/reduction electrolyte using an organic solvent. In such a conventional dye-sensitized solar cell including the electrolyte, which is obtained from the organic solvent, the electrolyte solvent is likely to volatilize from the solar cell when the external temperature of the solar cell is increased due to the sunbeams. Accordingly, the conventional dye-sensitized solar cell is unstable and cannot be utilized.

SUMMARY OF THE INVENTION

The present invention provides dye-sensitized solar cells that provide an energy conversion efficiency of the same level as that of a conventional dye-sensitized solar cell and provide stable photoelectric chemical characteristics regardless of changes in an external environment, such as external temperature of the solar cells, by minimizing the possibility of volatilization of a solvent included in polymer electrolyte gel.

According to an aspect of the present invention, there is provided a dye-sensitized solar cell comprising a semiconductor electrode, an opposed electrode, and a polymer electrolyte gel interposed between the semiconductor electrode and the opposed electrode while including poly(vinylidene fluoride) (PVDF) polymer or the copolymer thereof.

The polymer electrolyte gel may be formed of a N-methy-2-pyrrolidone solvent and the PVDF polymer or the copolymer thereof which is dissolved in the solvent to a predetermined amount. Alternatively, the polymer electrolyte gel may be formed of a 3-methoxypropionitrile (MP) solvent and the PVDF polymer or the copolymer thereof which is dissolved in the solvent to a predetermined amount. It is preferable that the polymer electrolyte gel is formed by mixing 3 to 20 wt % of the PVDF polymer of the copolymer thereof based on the weight of the solvent.

The semiconductor electrode is formed of a transparent conductive substrate and a transition metal oxide layer, which is coated on the transparent substrate. The semiconductor electrode further comprises a dye molecular layer, which is chemically adsorbed to the transition metal oxide layer. The dye molecular layer may be formed of ruthenium complex.

The transition metal oxide layer is formed of nanocrystalline titanium dioxide.

The opposed electrode is formed of a transparent conductive substrate and a platinum layer, which is coated on the transparent substrate.

The dye-sensitized solar cell according to the present invention improves the photo voltage compared to the conventional solar cell and reduces the volatility of the solvent while not lowering the energy conversion efficiency. Thus, the dye-sensitized solar cell is stable for a long time regardless of changes in the external conditions, such as increase of the external temperature of the solar cell due to the sunbeams.

BRIEF DESCRIPTION OF THE DRAWINGS

The above objectives and advantages of the present invention will become more apparent by describing in detail preferred embodiment thereof with reference to the attached drawings in which.

DETAILED DESCRIPTION OF THE INVENTION

The present invention will now be described more fully with reference to the accompanying drawings, in which preferred embodiment of the invention is shown.

Figure 1:
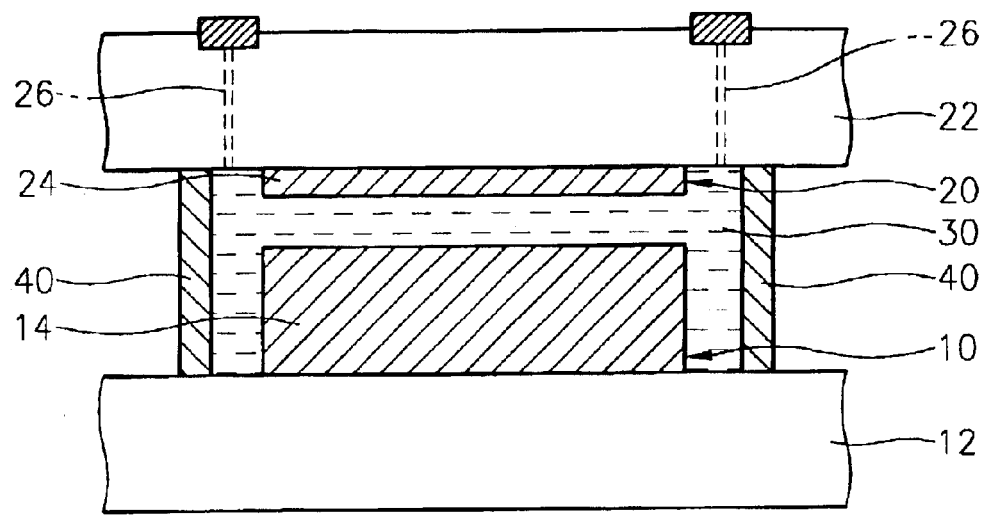
FIG. 1 is a schematic view illustrating the structure of a dye-sensitized solar cell according to the present invention.

FIG. 1 is a schematic view illustrating the structure of a dye-sensitized solar cell according to the present invention.

Referring to FIG. 1, a dye-sensitized solar cell according to the present invention includes a semiconductor electrode 10, an opposed electrode 20, and a polymer electrolyte gel 30 interposed there between.

Here, the polymer electrolyte gel 30 is formed of a mixture, which is formed by dissolving poly(vinylidene fluoride) (PVDF) polymer or the copolymer thereof in an N-methyl-2-pyrrolidone (NMP) solvent or a 3-methoxypropionitrile (MP) solvent. It is preferable that the PVDF polymer or the copolymer thereof is mixed to an amount of 3 to 20 parts by weight based on the weight of the NMP solvent. In addition, the polymer electrolyte gel 30 as an oxidation/reduction material is formed of an iodine oxidation/reduction ($I_3^-/I^{31}$) electrolyte.

The semiconductor electrode 10 is formed by coating a transition metal oxide layer 14 on a conductive glass substrate 12, for example, a transparent conductive glass substrate on which indium tin oxide (ITO) or $SnO_2$ is coated. Here, the transition metal oxide layer 14 is formed of nanocrystaline titanium dioxides, which have a size of about 5 to 30 nm. It is preferable that the thickness of the transition metal oxide layer 14 is about 5 to 30 μm. In the transition metal oxide layer 14, dye molecular layers formed of ruthenium complex are chemically adsorbed on the transition metal oxides, i.e., nanocrystalline titanium dioxides.

The opposed electrode 20 is formed by coating a platinum layer 24 on a conductive glass substrate 22, for example, a transparent conductive glass substrate on which ITO or $SnO_2$ is coated. Here, the platinum layer 24 on the opposed electrode 20 is arranged to oppose to the transition metal oxide layer 14 of the semiconductor electrode 10.

In the above-described dye-sensitized solar cell, the polymer solvent gel of forming the polymer electrolyte gel 30, which fills the space between the semiconductor electrode 10 and the opposed electrode 20, has a significantly lower volatility than that of the solvent used in a conventional dye-sensitized solar cell. Thus, the dye-sensitized solar cell according to the present invention solves the problem of volatility due to external conditions, thereby improving stability.

Hereafter, a method of manufacturing the dye-sensitized solar cell will be described.

In order to manufacture the semiconductor electrode 10 as a cathode, the transition metal oxide is manufactured. To this end, a titanium dioxide colloid solution is synthesized by a hydrothermal synthesis method using titanium (IV) isopropoxide and acetic acid in an autoclave maintaining a temperature of 220° C. The solvent is evaporated from the synthesized titanium dioxide colloid solution until the content of the titanium dioxide becomes 10 to 15 parts by weight of the solution. Thus, a nanocrystalline titanium dioxide colloid solution in which the nanocrystalline has a size of about 5 to 30 nm is obtained. Polyethylene glycol and polyethylene oxide are added to the titanium dioxide colloid solution by an amount of about 30 to 50 parts by weight based on the weight of the titanium dioxide colloid solution. Thus, a viscous nanocrystalline titanium dioxide mixture is manufactured.

The mixture is coated on the transparent conductive glass substrate 12 on which ITO or $SnO_2$ is coated to a thickness of about 6 μm, and the transparent conductive glass substrate 12 is heated at a temperature of about 450 to 550° C. to remove polyethylene glycol and polyethylene oxide and to attach the nanocrystalline oxides to each other. The glass substrate 12 on which the nanocrystalline titanium dioxide is coated is soaked in a dye solution formed of ruthenium complex for more than 24 hours. Thus, a cathode including the dye-coated transition metal oxide layer 14 is completed.

In order to form the opposed electrode 20 as the anode, the platinum layer 24 is coated on the transparent conductive glass substrate 22 on which ITO or $SnO_2$ is coated.

Thereafter, in order to assemble the anode and the cathode, the platinum layer 24 and the transition metal oxide layer 14 face each other while arranging the conductive surfaces of the anode and the cathode in inner directions. Here, a polymer layer 40 formed of SURLYN manufactured by du Pont de Nemours and Company is placed between the anode and the cathode to a thickness of about 30 to 50 μm. Thereafter, the anode and the cathode are attached on a hot plate at a temperature of about 100 to 140° C. using a pressure of about 1 to 3 atmospheres. Accordingly, the polymer layer 40 is firmly attached to the surfaces of the electrodes due to heat and pressure. Thereafter, polymer electrolyte gel 30 is filled in the space between the electrodes through fine holes 26 formed in the anode. Here, the polymer electrolyte gel 30 is a mixture formed by dissolving the PVDF polymer or the copolymer thereof in the NMP solvent or the MP solvent. After the space between the electrodes are completely filled with the polymer electrolyte gel 30, the thin glass, such as SURLYN is heated in a moment to close the fine holes 26.

In order to evaluate the energy efficiency of the dye-sensitized solar cell according to the present invention, the photo voltage and current of the solar cell were measured as follows.

A xenon lamp (Oriel, 91193) was used as a light source, and the solar condition, i.e., AM 1.5, of the xenon lamp was corrected using a reference solar cell, i.e., Frunhofer institute Solar Engeriessyteme, Certificate No. C-ISD369.

Figure 2:
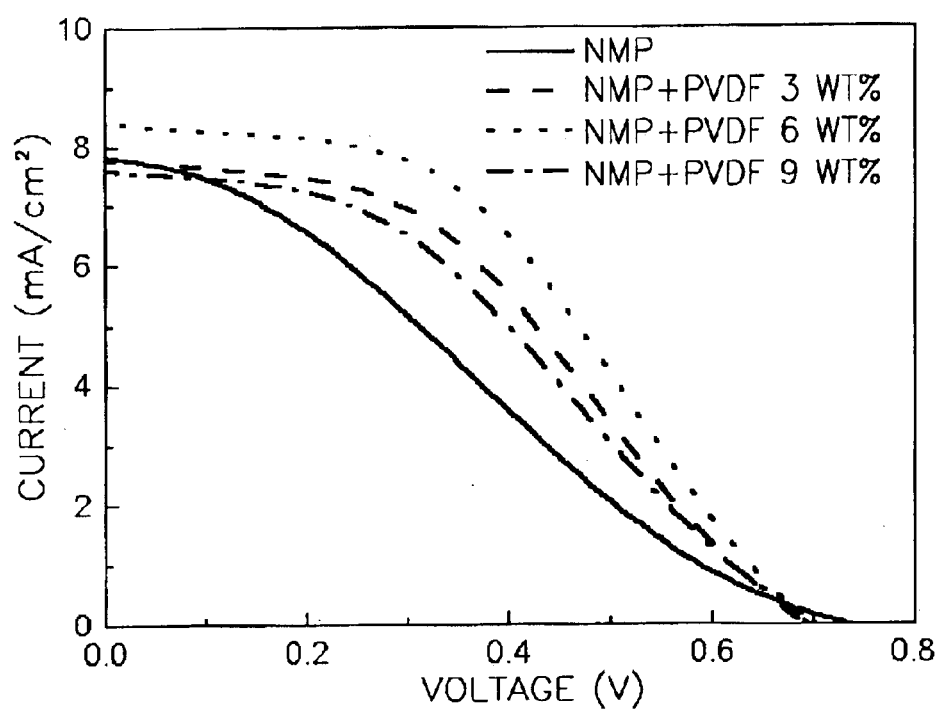
FIG. 2 is a graph illustrating a measurement result of changes in photovoltaic characteristics of polymer electrolyte gel in a dye-sensitized solar cell according to the present invention, corresponding to the concentration of poly(vinylidene fluoride) polymer.

FIG. 2 is a graph illustrating a measurement result of changes in photovoltaic characteristics of the polymer electrolyte gel in the dye-sensitized solar cell according to the present invention, corresponding to the added amount of PVDF polymer. In this case, the polymer electrolyte gels were formed by adding the PVDF polymer to the NMP solvent by amounts of 0, 3, 6, and 9 parts by weight based on the weight of the NMP solvent, and the changes in the photovoltaic characteristics of the dye-sensitized solar cells manufactured using the polymer electrolyte gels were measured. Here, the iodine oxidation/reduction material, i.e., LiI 0.5 M, $I_2$ 0.1 M, was used as the electrolyte. The current density $J_{SC}$, voltage $V_{OC}$, energy conversion efficiency, and fillfactor ff, which were calculated from the photo current-voltage graph corresponding to the added amount of the PVDF polymer, are shown in Table 1.

TABLE 1

| Polymer electrolyte gel | $J_{SC}$ (mA/cm$^2$) | $V_{OC}$ (V) | Energy conversion efficiency (%) | ff |
| --- | --- | --- | --- | --- |
| NMP | 7.85 | 0.74 | 1.55 | 0.27 |
| NMP + PVDF 3 wt % | 7.79 | 0.69 | 2.23 | 0.41 |
| NMP + PVDF 6 wt % | 8.38 | 0.69 | 2.60 | 0.45 |
| NMP + PVDF 9 wt % | 7.60 | 0.70 | 2.04 | 0.38 |

Referring to Table 1, the fillfactor ff can be significantly increased without reducing the current density $J_{SC}$ and the voltage $V_{OC}$ by forming the iodine oxidation/reduction electrolyte solution using the NMP solvent and forming the polymer electrolyte gel through adding the PVDF polymer to the iodine oxidation/reduction electrolyte solution. Here, the PVDF polymer was added to the polymer electrolyte polymer to reduce the volatility of the electrolyte solution, at the first time; however, by adding the PVDF polymer to the polymer electrolyte gel, the fillfactor ff was improved as well as lowering the volatility, so the energy conversion efficiency was improved. When the PVDF polymer was added by 6 parts by weight, the fillfactor ff was improved by 67% compared to the case where the PVDF polymer was not added. When the PVDF polymer was added by 9 parts by weight, the fillfactor ff was reduced compared to the case where the PVDF polymer was added by 6 parts by weight. As a result, it is determined that the electrolyte formed by adding about 6 parts by weight of the PVDF polymer based on the weight of the NMP solvent generates the optimum photoelectric chemical characteristics.

Figure 3:
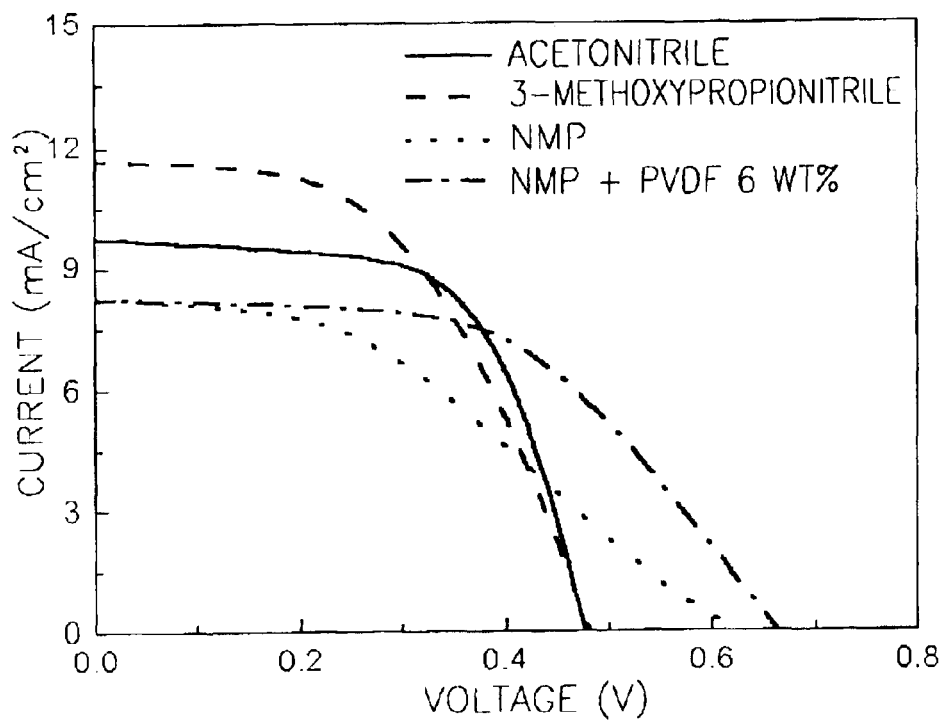
FIG. 3 is a graph illustrating an evaluation result of current-voltage characteristics of a dye-sensitized solar cell according to the present invention.

FIG. 3 is a graph illustrating an evaluation result of current-voltage characteristics of the dye-sensitized solar cell according to the present invention. Here, the polymer electrolyte gel of the dye-sensitized solar cell according to the present invention was formed by adding 6 parts by weight of the PVDF polymer to the NMP solvent. In addition, dye-sensitized solar cells as controlled solar cells were formed using acetonitrile (AN), 3-Methoxypropionitrile (MP) as solvents. Here, LiI 1.0 M and $I_2$ 0.1 M were used as the iodine electrolyte. The photovoltaic chemical characteristics, i.e., current density Jsc, voltage Voc, energy conversion efficiency, and fillfactor ff, were calculated by the current-voltage graph corresponding to the kind of the solvents as shown in Table 2.

TABLE 2

| Electrolyte | $J_{SC}$ (mA/cm$^2$) | $V_{OC}$ (V) | Energy conversion effiency (%) | ff |
|---|---|---|---|---|
| AN | 8.79 | 0.48 | 2.92 | 0.62 |
| MP | 11.71 | 0.48 | 2.88 | 0.51 |
| NMP | 8.27 | 0.62 | 2.02 | 0.39 |
| NMP + PVDF 6 wt % | 8.28 | 0.66 | 2.92 | 0.53 |

Referring to Table 2, when the NMP solvent is used, the voltage $V_{OC}$ was increased by more than about 30% compared to the case where the AN or the MP was used under the same iodine electrolyte condition. When the NMP solvent not including the PVDF polymer was used, the voltage $V_{OC}$ was increased but the fillfactor ff was decreased so that the energy conversion efficiency was worse than that of the cases using AN and MP. However, when the PVDF polymer was added to the NMP solvent to an amount of 6 parts by weight based on the weight of the NMP solvent, the fillfactor ff was significantly increased while not reducing the voltage $V_{OC}$ or the current density $J_{SC}$ compared to the case of using the NMP without the PVDF polymer. As a result, the energy conversion efficiency was improved by about 50%. With respect to the photochemical characteristics of the polymer solvent gel, when the PVDF polymer is added to 6 parts by weight based on the weight of the NMP solvent, the current density $J_{SC}$ was slightly reduced but the voltage $V_{OC}$ was significantly increased, so the energy conversion efficiency was similar to that of the cases using the conventional solvents. In other words, since the polymer solvent gel used in the dye-sensitized solar cell according to the present invention has a low volatility, it is convenient to manufacture the solar cell. In addition, the problem of volatility due to the external temperature of the solar cell can be solved.

The polymer electrolyte gel according to the present invention includes polymers so that the viscosity of the solution is increased and the volatility of the solution is decreased. However, the iodine oxidation/reduction material has to efficiently supply electrons to the oxidized dye molecules by receiving electrons from the anode of the dye-sensitized solar cell and injecting electrons to the semiconductor electrode. Thus, it is required to evaluate the effects of the increase of the viscosity of the polymer electrolyte gel to the reaction of the iodine oxidation/reduction material.

Figure 4:
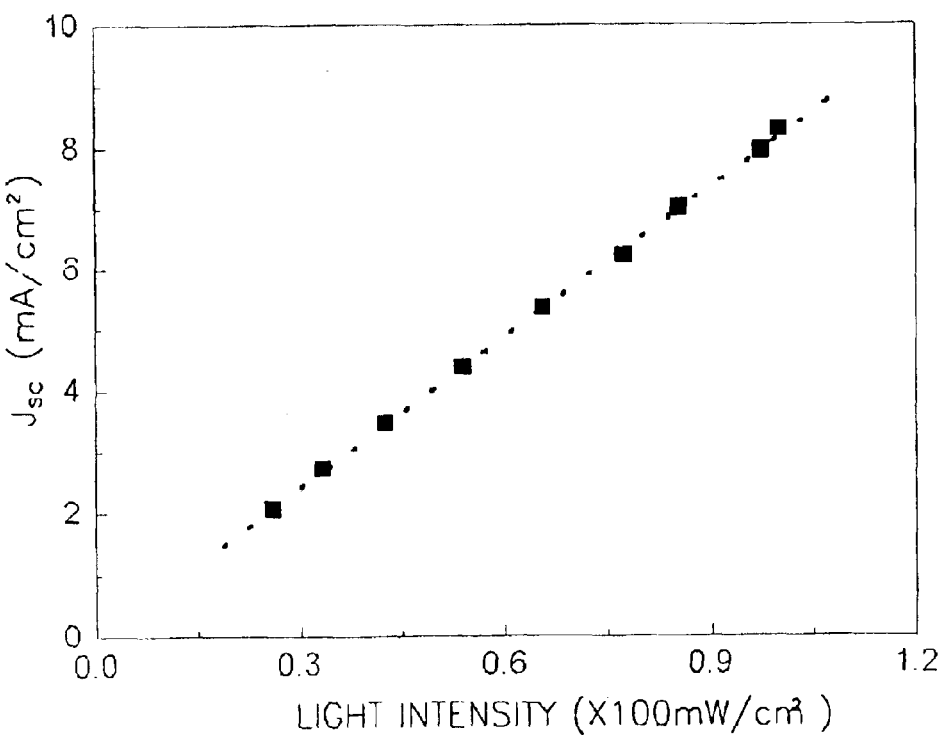
FIG. 4 is a graph illustrating an evaluation result of photovoltaic characteristics of a dye-sensitized solar cell according to the present invention, corresponding to changes in light intensity.

FIG. 4 is a graph illustrating an evaluation result of the photovoltaic chemical characteristics of the dye-sensitized solar cell according to the present invention, corresponding to changes in light intensity, in order to evaluate the effects of the increase in the viscosity of the polymer electrolyte gel to the reaction of the iodine oxidation/reduction material.

Referring to FIG. 4, when the NMP solvent including the PVDF polymer to an amount of 6 parts by weight based on the weight of the NMP solvent was used as the polymer electrolyte gel and the LiI/I$_2$ (1.0 M/0.1 M) was used as the iodine oxidation/reduction material in the dye-sensitized solar cell, the current density $J_{SC}$ was regularly increased according to the increase of the light intensity. As a result, it is well known that as the light intensity increases, the number of electrons generated from the dye is increased regularly. In addition, the oxidation/reduction material efficiently receives the electrons from the platinum electrode to be reduced, and the reduced reduction material efficiently reduces the oxidized dye. It is well known that even if the viscosity of the polymer electrolyte gel obtained by adding the PVDF polymer to the NMP solvent is increased, the oxidation/reduction reaction efficiently occurs in the solar cell, so the performance of the dye-sensitized solar cell does not deteriorate.

As described above, the dye-sensitized solar cell according to the present invention uses N-methyl-2-pyrrolidone or MP solvent as the polymer electrolyte gel, which is interposed between the semiconductor electrode and the opposed electrode, and the electrolyte, which is formed by dissolving the PVDF polymer or the copolymer thereof in the solvent. The dye-sensitized solar cell according to the present invention prevents the solvent from being volatilized, so improved photovoltaic characteristics in proportional to the light intensity are provided. In addition, the dye-sensitized solar cell according to the present invention improves the photo voltage and reduces the volatility of the solvent compared to the conventional solar cell while not lowering the energy conversion efficiency. Thus, the dye-sensitized solar cell according to the present invention is stable for a long time regardless of changes in the external conditions, such as increase of the external temperature of the solar cell due to the sunbeams.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A dye-sensitized solar cell comprising:

a semiconductor electrode;

an opposed electrode; and a polymer electrolyte gel interposed between the semiconductor electrode and the opposed electrode while including poly(vinylidene fluoride) (PVDF) polymer or the copolymer thereof, wherein the polymer electrolyte gel is formed of a 3-methoxypropionitrile (MP) solvent and the PVDF polymer or the copolymer thereof which is dissolved in the solvent to an amount.

2. The solar cell of claim 1, wherein the polymer electrolyte gel is formed by mixing 3 to 20 wt % of the PVDF polymer of the copolymer thereof based on the weight of the solvent.

3. The solar cell of claim 1, wherein the semiconductor electrode is formed of a transparent conductive substrate and a transition metal oxide layer, which is coated on the transparent substrate.

4. The solar cell of claim 3, wherein the semiconductor electrode further comprises a dye molecular layer, which is chemically adsorbed to the transition metal oxide layer.

5. The solar cell of claim 4, wherein the dye molecular layer is formed of ruthenium complex.

6. The solar cell of claim 3, wherein the transition metal oxide layer is formed of nanocrystalline titanium dioxide.

7. The solar cell of claim 1, wherein the opposed electrode is formed of a transparent conductive substrate and a platinum layer, which is coated on the transparent substrate.

* * * * *